US011302087B2

(12) United States Patent
Goodsitt et al.

(10) Patent No.: US 11,302,087 B2
(45) Date of Patent: Apr. 12, 2022

(54) AUGMENTED REALITY AUTHENTICATION FOR PUBLIC DEVICE INTERFACES

(71) Applicant: Capital One Services, LLC, McLean, VA (US)

(72) Inventors: Jeremy Goodsitt, Champaign, IL (US); Austin Walters, Savoy, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/231,356

(22) Filed: Apr. 15, 2021

(65) Prior Publication Data

US 2021/0304511 A1 Sep. 30, 2021

Related U.S. Application Data

(63) Continuation of application No. 16/668,593, filed on Oct. 30, 2019, now Pat. No. 11,010,981, which is a continuation of application No. 16/055,008, filed on Aug. 3, 2018, now Pat. No. 10,504,292.

(51) Int. Cl.
*G06T 19/00* (2011.01)
*G07F 19/00* (2006.01)
*G06F 21/36* (2013.01)

(52) U.S. Cl.
CPC ............ *G06T 19/006* (2013.01); *G06F 21/36* (2013.01); *G07F 19/206* (2013.01)

(58) Field of Classification Search
CPC .................................................. G06T 19/006
See application file for complete search history.

(56) References Cited

U.S. PATENT DOCUMENTS

| 2016/0109954 | A1* | 4/2016 | Harris ............... G06K 9/00671 345/156 |
| 2016/0306958 | A1* | 10/2016 | Dow ....................... G06F 21/36 |
| 2017/0123750 | A1* | 5/2017 | Todasco .................. G06F 21/10 |
| 2018/0158053 | A1* | 6/2018 | Adams ..................... G06F 3/011 |

* cited by examiner

*Primary Examiner* — Shivang I Patel
(74) *Attorney, Agent, or Firm* — Finnegan, Henderson, Farabow, Garrett & Dunner, LLP

(57) ABSTRACT

Augmented reality-based user authentication for automatic teller machines is disclosed. Embodiments include a system with one or more memory devices storing instructions. The system may further include one or more processors configured to execute the instructions and to receive an authentication request from a user of an ATM. In some embodiments, the processor may retrieve, from the one or more memory devices, an augmented reality password specific to a user, the password comprising an augmented reality object. In other embodiments, the processor may identify a personal user device configured to receive the password, and personalize the password, based on information previously configured by the user. In yet other embodiments, the processor may be configured to present the augmented reality object via a display on the personal user device, and to determine, based on input provided by a user to the augmented reality object, whether to approve the authentication request.

20 Claims, 4 Drawing Sheets

AUGMENTED REALITY AUTHENTICATION FOR PUBLIC DEVICE INTERFACES

CROSS-REFERENCE TO RELATED APPLICATIONS

This application is a continuation of U.S. patent application Ser. No. 16/668,593, filed on Oct. 30, 2019, currently pending and allowed, which is a continuation of U.S. patent application Ser. No. 16/055,008, filed on Aug. 3, 2018, which issued as U.S. Pat. No. 10,504,292 on Dec. 10, 2019. The disclosures of the above-referenced applications are expressly incorporated herein by reference in their entireties.

TECHNICAL FILED

The present disclosure relates to authenticating a user and, more particularly, for authenticating a user of a public device interface, such as an automatic teller machine (ATM), using augmented reality systems and methods.

BACKGROUND

In today's digital age, systems and computing enable convenient and remote access to sensitive information and performance of sensitive transactions. For example, a user may operate a properly configured mobile computing device to conduct or engage in certain mobile or online banking activities that traditionally required the user to be physically present at a banking location. But while users may now remotely perform some banking activities using a mobile device, many transactions or other activities continue to require in-person authentication at a banking location, such as use of an automatic teller machine (ATM) to withdraw cash or conduct other in-person account transactions.

Traditional ATMs require entry of a personal identification number (PIN) to authorize and authenticate a user. Some methods of authentication may include a password or other biometric authentication information to authenticate the user of an ATM. These techniques, however, have considerable drawbacks. For example, passwords, shared secrets, and even biometric information are vulnerable to replication or fraudulent discovery, such as through data theft, social engineering, eavesdropping, or other criminal acts. Thus, use of these traditional techniques alone may not be satisfactory. Although security can be increased using additional security layers, simply supplementing conventional authentication techniques with additional conventional techniques may inconvenience authorized users, by creating a slow and cumbersome authentication process, requiring additional user-involved steps as part of the authentication process. Typical authentication processes also do not discern between certain user actions that are considered riskier or less frequent transactions, for which additional authentication steps may be desirable.

Thus, new techniques are desired to enhance security and increase confidence in authenticating the user of an ATM based on information not easily discoverable or replicated, and while not overburdening the user.

SUMMARY

Systems and methods are disclosed for authenticating ATM users using augmented reality techniques. Augmented reality may be used as an alternative or supplemental technique for authenticating a user, by enhancing natural environments or situations and offering perceptually enriched experiences. With the help of advanced augmented reality technologies, for example, computer vision and object recognition, the information about the surrounding real world of the user becomes interactive. Information about the environment and its objects is typically overlaid on the real-world information, and may be superimposed on the user's field of view of the real world physical environment. In the context of authenticating a user at an ATM, disclosed techniques using augmented reality enhances security, provides for more efficient operation of the ATM machine by requiring fewer input steps, and enhances the user's experience of operating the ATM machine by allowing the user to input a password in an augmented reality view visible only to that user. Consistent with a first embodiment, a system for authenticating a user of an automatic teller machine (ATM) using augmented reality is disclosed.

One aspect of the present disclosure is directed to a system for authenticating a user of an automatic teller machine using augmented reality. The system may include one or more memory devices storing instructions. The system may further include one or more processors configured to execute the instructions and to receive an authentication request from a user of an ATM, retrieve, from the one or more memory devices, an augmented reality password specific to a user, wherein the password includes at least one augmented reality object, identify a personal user device configured to receive the password, personalize, based on information previously configured by the user, the password, present, via a display on the personal user device, the at least one augmented reality object, and determine, based on input provided by a user to the at least one augmented reality object, whether to approve the authentication request.

Another aspect of the present disclosure is directed to a method for authenticating a user of an automatic teller machine using augmented reality, the method including receiving an authentication request from a user of an ATM, retrieving an augmented reality password specific to a user, wherein the password includes at least one augmented reality object, identifying a personal user device configured to receive the password, personalizing, based on information previously configured by the user, the password, presenting, via a display on the personal user device, the at least one augmented reality object, and determining, based on input provided by a user to the at least one augmented reality object, whether to approve the authentication request.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

The present disclosure is generally directed to systems and methods for authenticating a user of an ATM using augmented reality. The system includes one or more memory devices storing instructions. The system may further include one or more processors configured to execute the instructions and to receive an authentication request from a user of an ATM. In some embodiments, the processor may retrieve, from the memory devices, an augmented reality password specific to a user, the password comprising an augmented reality object. In other embodiments, the processor may identify a personal user device configured to receive the password, and to personalize the password, based on information previously configured by the user. In yet another embodiment, the processor may be configured to present the password via a display on the personal user device, and determine whether to approve the authentication request based on input provided by a user to the augmented reality object.

Some aspects of the present disclosure may be incorporated in technological areas involving client-provider relationships, or more broadly, involving two or more parties requiring interaction. In some aspects, such as those described herein with respect to an ATM of a financial service provider (or any other public device interface), a user may be presented with one or more augmented reality objects on a screen of a personal user device that can be manipulated through various means to input a password and authenticate the user to use the ATM. Because only the user holding the personal user device may be able to see the augmented reality objects, the disclosed embodiments enhance security as compared to traditional authentication methods.

Reference will now be made in detail to the disclosed embodiments, examples of which are illustrated in the accompanying drawings.

Figure 1:
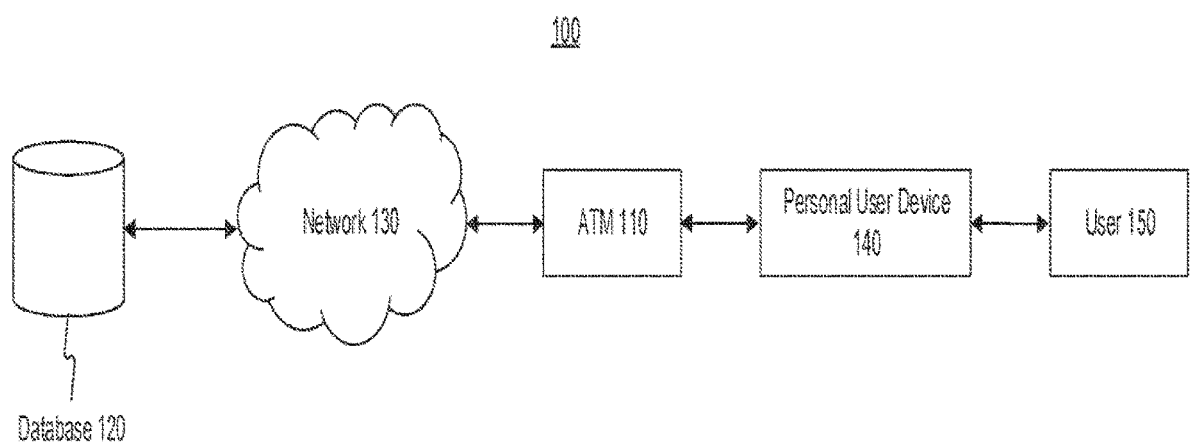
FIG. 1 a block diagram of an exemplary system, consistent with the disclosed embodiments.

FIG. 1 is a block diagram of an exemplary system 100 for authenticating a user of an automatic teller machine using augmented reality, consistent with disclosed embodiments. System 100 may include an ATM 110, a database 120, and a personal user device 140. In some embodiments, as shown in FIG. 1, each component of system 100 may be connected to a network 130. However, in some embodiments, components of system 100 may be directly connected with each other.

While reference is generally made to an ATM 110 of a financial service provider throughout the embodiments described below, other public interfaces may use the same systems and methods for authenticating a user 150 using augmented reality. Examples of other public interfaces interchangeable with ATM 110 include bank teller services, safe-deposit boxes, and vending machines.

Database 120 may include, for example, Oracle™ databases, Sybase™ databases, or other relational databases or non-relational databases, such as Hadoop™ sequence files, HBase™, or Cassandra™. Database 120 may include computing components (e.g., database management system, database server, etc.) configured to receive and process requests for data stored in memory devices of database 120 and to provide data from database 120. In some embodiments, database 120 may take the form of a server, a general purpose computer, a mainframe computer, or any combination of these components. Other implementations consistent with disclosed embodiments are possible as well.

Network 130 may comprise any type of computer networking arrangement configured to provide communications or exchange data, or both, between components of system 100. For example, network 130 may include any type of network (including infrastructure) that provides communications, exchanges information, and/or facilitates the exchange of information, such as the Internet, a private data network, a virtual private network using a public network, a Wi-Fi network, a LAN or WAN network, and/or other suitable connections that may enable information exchange among various components of system 100. Network 130 may also include a public switched telephone network ("PSTN") and/or a wireless cellular network. Network 130 may be a secured network or unsecured network. In some embodiments, one or more components of system 100 may communicate directly through a dedicated communication link(s).

Figure 3A:
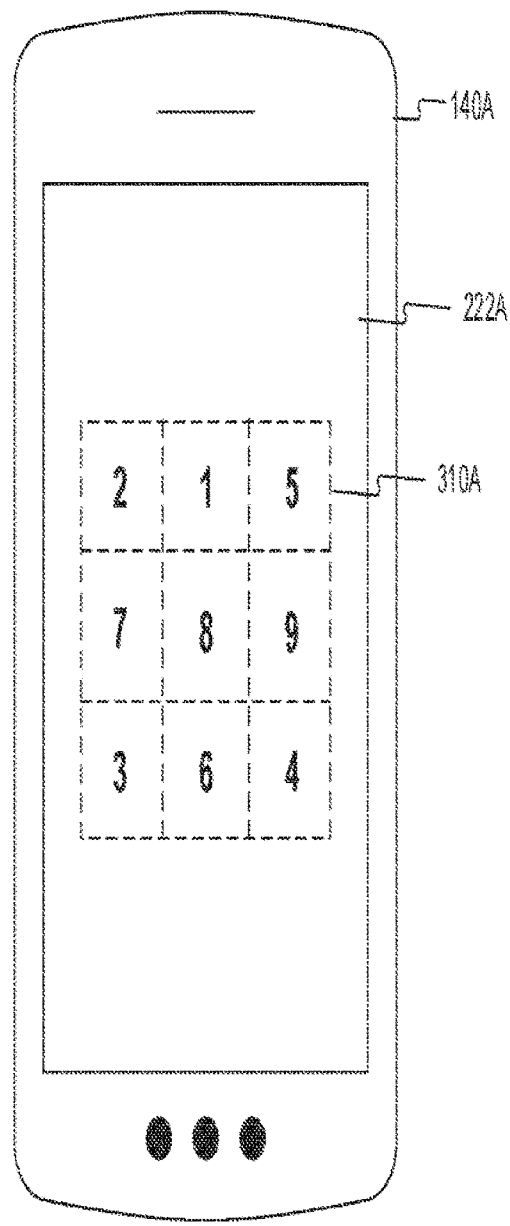
FIGS. 3A and 3B illustrate exemplary personal user devices and augmented reality objects, consistent with the disclosed embodiments.
Figure 3B:
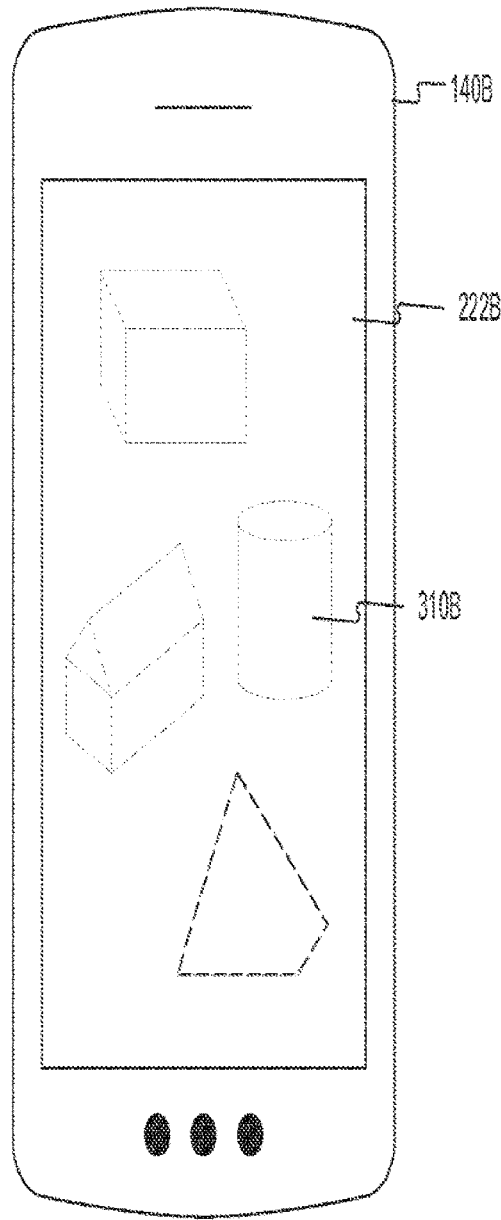

In some embodiments, personal user device 140 may include one or more computing devices configured with appropriate software to perform operations consistent with authenticating a user of an ATM using augmented reality (e.g., as shown in FIGS. 3A and 3B), using information stored on personal user device 140 or database 120. For example, database 120 may be configured to contain a pre-determined augmented reality password (or passwords) previously configured by a user 150 prior to use of ATM 120. For example, in some embodiments, the information in database 120 may be retrieved by personal user device 140 when a request is made to authenticate a user over network 130.

Figure 2:
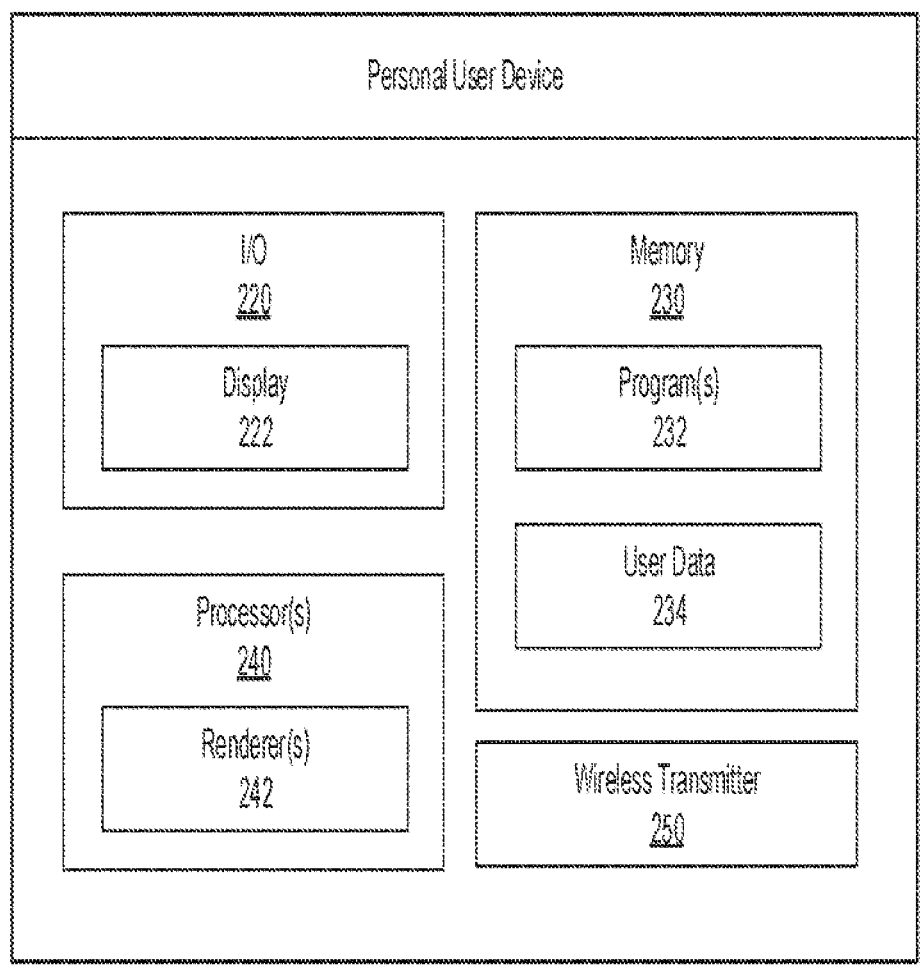
FIG. 2 is a block diagram of an exemplary personal user device, consistent with the disclosed embodiments.

As shown in FIG. 2, personal user device 140 may include, among other things, an input/output ("I/O") module 220, including a display 222; memory 230, including programs 232 and data 234; processor(s) 240, including renderer(s) 242; and wireless transmitter 250. Personal user device 140 may also include other suitable components not illustrated in FIG. 2, consistent with its ability to communicate with database 120 and/or connect to network 130. Additionally, those skilled in the art will recognize that the illustrations of personal user device 140 are simplified to highlight aspects of the present invention and that hardware devices typically include a variety of components not shown in FIG. 2.

In some embodiments, personal user device 140 may be equipped with additional components, such as a camera, a position sensor detection (PSD) device, a motion sensor detection (MSD) device, an infra-red camera, a finger-print recognition device, an accelerometer, a global positioning system (GPS) device, a solid-state compass, etc., to facilitate the authentication process of user 150.

In some embodiments, personal user device 140 may be, for example, a smartphone, tablet computer, smart eyewear, hand-held display, body-mounted display, head-mounted display, heads-up display, see through head mounted display, helmet-mounted display, or the like. Other suitable devices may be used. A user may move around the ATM with personal user device 140 to obtain a real-time augmented reality image displayed on display 222 contained within personal user device 140, as described in greater detail below.

Personal user device 140 may include a display 222 for displaying an augmented reality object. Display 222 may include, for example, liquid crystal displays (LCD), light emitting diode screens (LED), organic light emitting diode screens (OLED), a touch screen, and other known display devices. Display 222 may display various information to user 150. For example, display 222 may display an interactive augmented reality object to user 150 enabling user 150 to perform authentication actions consistent with the disclosed methods. Display 222 may display touchable or selectable options for user 150 to select, and may receive user selection of options through a touch screen.

Memory 230 may include one or more storage devices configured to store instructions executable by processor 240 to perform functions related to the disclosed embodiments. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

In some embodiments, memory 230 may be configured with one or more software instructions, such as one or more program(s) 232 that, when executed by processor 240, perform the disclosed authentication methods using augmented reality. The disclosed embodiments are not limited to separate programs or computers configured to perform dedicated tasks. For example, memory 230 may include a program 232 that performs the functions of system 200, or program 232 could comprise a collection of programs executed in parallel or in series by one or more processors. Additionally, processor 240 may execute one or more programs located remotely from system 200. For example, system 200, may, via network 130, access one or more remote programs that, when executed, perform functions related to certain disclosed embodiments. Processor 240 may further execute one or more programs located in database 120. In some embodiments, programs 232 may be stored in an external storage device, such as a cloud server located outside of system 200, and processor 240 may execute programs 232 remotely.

Memory 230 may also store data that may reflect any type of information in any format that the system may use to perform operations consistent with the disclosed embodiments. For example, in some embodiments, memory 230 may store data or other information corresponding to a plurality of augmented reality passwords associated with a user 150. Memory 230 may also store data for identifying and creating the prescribed augmented reality password and augmented reality object for display on display 222. Memory 230 may also store instructions to enable processor 240 to execute one or more applications, such as server applications, network communication processes, and any other type of application or software including software for performing operations associated with a financial service account. Alternatively, the instructions, application programs, etc., may be stored in an external storage (such as database 120) in communication with system 200 via network 130 or any other suitable network.

Memory 230 may further include client data 234, which may include information about users of a financial service provider. For example, user data 234 may include client account information including any information associated with a financial service account or other information associated with a client. User data 234 may include data used to identify the user based on image data, such as a plurality of stored images or image data, or other related data for identifying a particular person based on analyzed image data, including data associated with facial features or other uniquely identifying information. In some embodiments, user data 234 may be stored in database 120, which may be an external storage device in communication with system 200 and personal user device 140 via network 130.

As shown in FIG. 2, processor 240 of personal user device 140 may include one or more known processing devices, such as, but not limited to, microprocessors from the Pentium™ or Xeon™ family manufactured by Intel™, the Turion™ family manufactured by AMD™, or any of various processors from other manufacturers. Processor 240 may constitute a single core or multiple core processor that executes parallel processes simultaneously. For example, processor 240 may be a single core processor configured with virtual processing technologies. In certain embodiments, processor 240 may use logical processors to simultaneously execute and control multiple processes. Processor 240 may implement virtual machine technologies, or other known technologies to provide the ability to execute, control, run, manipulate, store, etc. multiple software processes, applications, programs, etc. In another embodiment, processor 240 may include a multiple-core processor arrangement (e.g., dual core, quad core, etc.) configured to provide parallel processing functionalities to allow system 200 to execute multiple processes simultaneously. One of ordinary skill in the art would understand that other types of processor arrangements could be implemented that provide for the capabilities disclosed herein. The disclosed embodiments are not limited to any type of processor(s) configured in system 200.

Processor 240 may communicate with other components of the system. In some embodiments, processor 240 may communicate with database 120 to perform functions in accordance with the disclosure. Communication between processor 240 and components of personal user device 140, and/or between processor 240 and database 120 may be configured to be executed through network 130.

Processor(s) 240 may also include renderer 242. In some embodiments, renderer 242 may be integrated within processor 240 directly, while in other embodiments, renderer 242 may be a discrete component (e.g., a discrete graphics processing unit). Thus, consistent with the present disclosure, the functions of renderer 242 may also be performed equally by the processor 240. In some embodiments, processor 240 and renderer 242 may be configured to receive information related to an augmented reality password and one or more augmented reality objects. In some embodiments, processor 240 and/or renderer 242 may then interpret and analyze the received information about an augmented reality password and one or more augmented reality objects, and generate or provide information for rendering an image associated with the augmented reality password and/or augmented reality objects on display 222. Other suitable rendering techniques known to a person well-versed in the technology may be implemented without departing from the scope of the claimed embodiments.

In some embodiments, processor 240 may be configured to receive an augmented reality password from database 120 via network 130. In other embodiments, the augmented reality password may be stored on ATM 110, which may receive the augmented reality password from database 120 via network 130. The augmented reality password may then be translated by processor 240 and any renderer 242 to generate an augmented reality object (such as augmented reality objects 330A and 330B in FIGS. 3A and 3B) to be displayed on display 222.

In some embodiments, personal user device 140 may include wireless transmitter 250. Wireless transmitter 250 may be configured to facilitate wireless communication and exchange of data between personal user device 140 and database 120 through network 130. In some embodiments, wireless transmitter 250 may be configured to facilitate wireless communication and exchange of data between Personal user device 140 and database 120 without requiring transmission via network 130, such as by using a direct wireless connection between personal user device 140 and database 120. In yet other embodiments, wireless transmitter 250 may be configured to facilitate wireless communication between each of the components of personal user device 140. Wireless transmitter 250 may include one or more digital and/or analog communication device to communicate with and/or detect other components, such as a network controller and/or wireless adapter for communicating over the Internet or suitable Wi-fi communication pathways. Other implementations consistent with disclosed embodiments are possible as well.

FIGS. 3A and 3B illustrate exemplary personal user devices 140A and 140B for displaying an augmented reality object to a user 150. For example, as shown, personal user devices 140A and 140B may include displays 222A and 222B displaying augmented reality objects 310A and 310B, which are generated by processor 240 in response to the system's processing of a user 150's augmented reality password.

In some embodiments, a user 150 may set preferences associated with one or more augmented reality passwords, which may be stored, for example, on database 120.

As shown in FIG. 3A, an augmented reality object 310A is displayed to user 150 on display 222A. In some embodiments, display 222A may include additional touchable or selectable options for user 310 to select, and may receive user selection of options through a touch screen associated with display 222A. For example, with reference to FIG. 3A, display 222A may include options for the user to zoom in or zoom out the view of augmented reality object 310A.

In some embodiments, a user 150 may interact with augmented reality object 310A by making gestures in the physical environment surrounding personal user device 140A and ATM 110, or by interacting directly with personal user device 140A in lieu of or in addition to entering a PIN on ATM 110. In some embodiments, augmented reality object 310A may be a virtual keypad with randomized numbers, displayed on display 222A of personal user device 140A, rather than on a display of the ATM 110. For example, in some embodiments, the user 150 may make a hand gesture in front of a camera associated with either user device 140A or ATM 110 to select one of the numbers present on augmented reality object 310A. In some embodiments, the numbers presented on the virtual keypad of augmented reality object 310A may change each time user 150 selects a number using a hand gesture. In some embodiments, by selecting the numbers associated with a user 150's previously set augmented reality password on the virtual keypad of augmented reality object 310A, a user 150 may be authenticated to use ATM 110. Because augmented reality object 310A is only visible to user 150, security is enhanced as only user 150 can see the selections and hand gestures made with respect to augmented reality object 310A.

As shown in FIG. 3B, in some embodiments, a user 150's augmented reality password may involve manipulation of various augmented reality objects 310B. Augmented reality objects 310B may include various three-dimensional shapes, such as a box, cylinder, or any other shape. In some embodiments, a user 150's augmented reality password may involve selecting shapes of a certain size, dimension, color, or any combination thereof. For example, a user 150 may set an augmented reality password that requires the user 150 to select any augmented reality objects 310B such as a square object, an orange object, the largest or smallest object, or any combination thereof. As described above, the user may select and interact with the augmented reality objects 310B by way of hand gesture or other methods. By selecting the augmented reality objects 310B associated with a user 150's augmented reality password, a user 150 may be authenticated to user ATM 110.

In some embodiments, personal user device 140A may be fixably attached to an ATM 110, and may exchange data with the ATM 110 over a cable tether connecting personal user device 140A and ATM 110. In other embodiments, personal user device 140A and ATM 110 may communicate wirelessly and/or or via network 130.

In some embodiments, rendering an augmented reality object for presenting on display 222A for a user 150 may include rendering a static augmented reality object or a dynamic augmented reality object, or any combination thereof. Static augmented reality objects may remain stationary in the display 222A as the user moves around the physical space and environment surrounding personal user device 140A and ATM 110. For example, as shown in FIG. 3A, as a user 150 moves around the physical environment with personal user device 140A, augmented reality object 310A may remain stationary with respect to the perspective of user 150. By contrast, in other embodiments, dynamic renditions may change dynamically as a user walks around in a physical space. One or more dynamic augmented reality objects, such as augmented reality objects 310B, may be further configured to change periodically, repetitively, in response to user interaction, or any combination thereof. For example, when a user 150 interacts with augmented reality objects 310B, user 150 may be allowed to move, rotate, select, or organize the augmented reality objects 310B.

Figure 4:
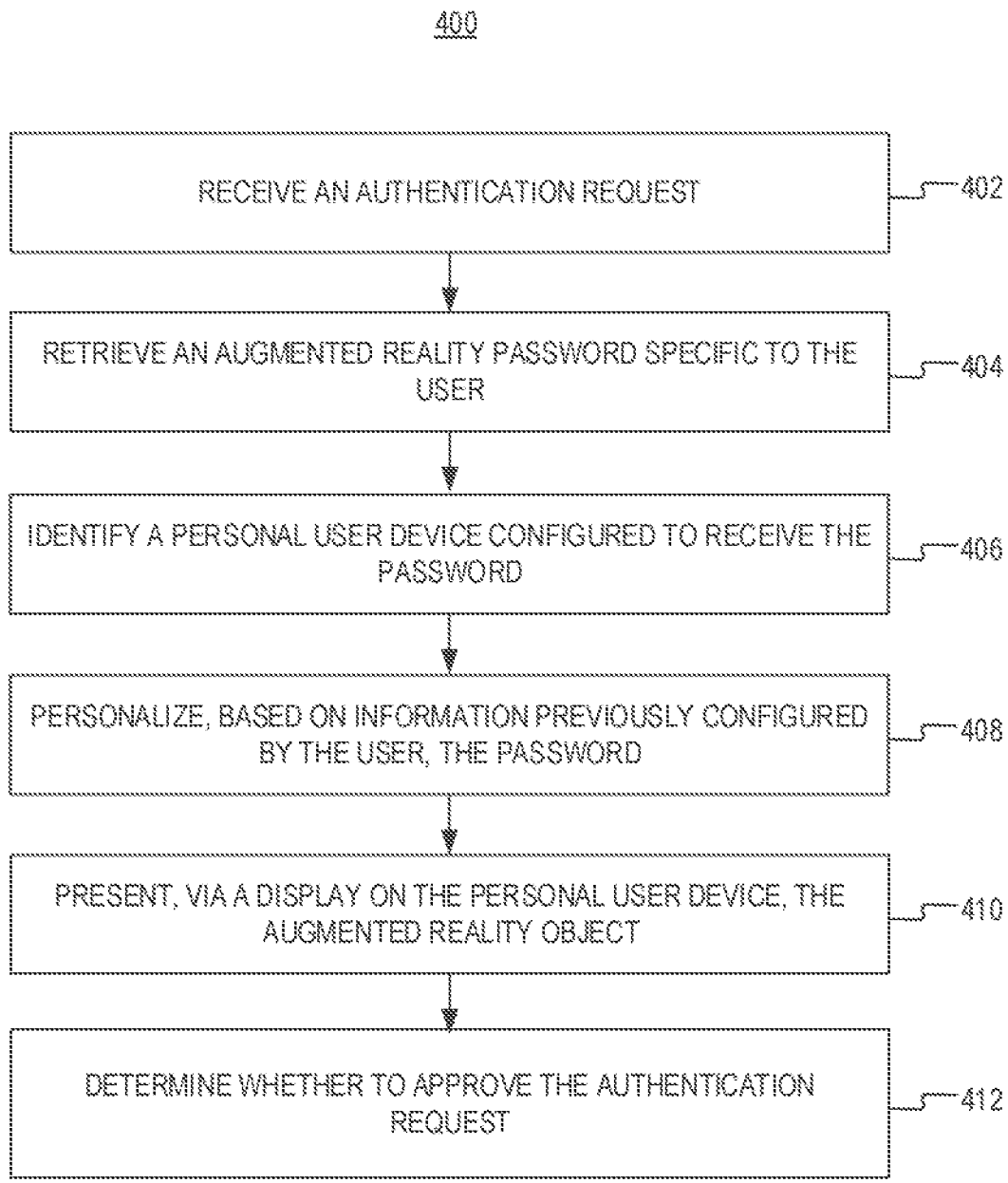
FIG. 4 is a flowchart of an exemplary authentication process, consistent with the disclosed embodiments.

FIG. 4 is an example of augmented reality authentication method 400, consistent with the disclosed embodiments. Method 400 may, for example, be executed by the at least one processor configured to receive signal information from the at least one sensor, and associated controller (e.g., controller 120) or any other appropriate hardware and/or software. Further, when executing method 400, the at least one processor may execute instructions stored in any of the modules discussed above with respect to FIG. 4.

In step 402, the system may receive an authentication request. In some embodiments, the system may receive an authentication request as a user approaches an ATM and manually selects an option to begin using the ATM services. For example, the authentication request may be received as part of an action requested using an application or internet browser executed on the personal user device. In other embodiments, the system may automatically determine, using identification verification, the identity of a user approaching the ATM, and the system may generate the authentication request without any manual input from the user.

In step 404, the system may retrieve an augmented reality password specific to a user, the password including an augmented reality object. In some embodiments, a user may have multiple combinations of passwords, which may include one or more augmented reality objects.

In step 406, the system may identify a personal user device configured to receive the password. As described in greater detail above, the personal user device receiving the password may be one of many devices, including, for example, a smartphone, tablet computer, or smart eyewear. In some embodiments, the personal user device may further comprise a storage medium configured to store information related to the augmented reality password. In other embodiments, the personal user device may further comprise a media recording unit configured to capture at least one of images or videos. In yet further embodiments, the personal user device may be configured to display additional information related to the at least one augmented reality object.

In step 408, the system may personalize, based on information previously configured by the user, the augmented reality password. For example, as described in greater detail above, the system may dynamically generate an augmented reality password based on parameters previously set by the user prior to authentication at the ATM.

In step 410, the system may present, via a display on the personal user device, the augmented reality object. In some embodiments, such as those described in FIGS. 3A and 3B, various augmented reality objects may be displayed, including a virtual key pad. In other embodiments, the personal user device may be further configured to customize the at least one augmented reality object based on at least one of the location of the user or a user preference. In some embodiments, the at least one augmented reality object presented to the user may be determined based on at least one of the location or the orientation of the hardware device.

In step 412, the system may determine whether to approve the authentication request. In some embodiments, such as those described in FIGS. 3A and 3B, based on the user's interaction with the augmented reality objects, the system may determine whether to approve the authentication request by comparing the user interaction with the augmented reality objects to the user's password.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java™ (see https://docs.oracle.com/javase/8/docs/tech notes/guides/language/), C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for authenticating a user of a public interface using augmented reality, the system comprising:
one or more memory devices storing instructions; and
one or more processors configured to execute the instructions to perform operations comprising:
retrieving, from the one or more memory devices, an augmented reality password personalized for a user based on information previously configured by the user, the augmented reality password comprising at least one augmented reality object;
presenting the at least one augmented reality object via a display on a personal user device;
collecting from the user an input associated with the at least one augmented reality object, wherein the input comprises at least one of moving, rotating, or selecting the augmented reality object;
determining, based on the input, an organization of the at least one augmented reality object;
comparing the organization of the at least one augmented reality object to the augmented reality password; and
determining, based on the comparison, whether to approve an authentication request.

2. The system of claim 1, the operations further comprising identifying the user based on user data comprising at least one of: account information, image data, or a facial feature of the user.

3. The system of claim 1, the operations further comprising presenting via the display, with the at least one augmented reality object, at least one display option associated with the at least one augmented reality object.

4. The system of claim 3, wherein the at least one display option comprises a selectable option controlling a zoom setting of a view of the at least one augmented reality object.

5. The system of claim 1, wherein the input comprises selecting at least two augmented reality objects, the at least two augmented reality objects having at least one of: different sizes, different colors, or different dimensions.

6. The system of claim 1, wherein the at least one augmented reality object is configured to remain stationary within the display with respect to a perspective of the user in response to the personal user device being in motion.

7. The system of claim 1, wherein the at least one augmented reality object is configured to change dynamically within the display with respect to a perspective of the user in response to the personal user device being in motion.

8. The system of claim 1, wherein the authentication request is received in response to verifying, without manual user input, an identity of the user as the user approaches a device separate from the personal user device and associated with the authentication request.

9. The system of claim 8, wherein the device is an automated teller machine (ATM).

10. The system of claim 1, wherein the personal user device is further configured to customize the at least one augmented reality object based on at least one of a location of the user or a user preference.

11. The system of claim 1, wherein the augmented reality object comprises a virtual key pad.

12. The system of claim 1, wherein the one or more memory devices store multiple augmented reality passwords of the user.

13. The system of claim 1, wherein collecting the input from the user comprises capturing a hand gesture of the user in front of a camera.

14. The system of claim 13, wherein the camera is part of the personal user device.

15. The system of claim 13, wherein the camera is part of a device separate from the personal user device and associated with the authentication request.

16. A computer-implemented method for authenticating a user of a public interface using augmented reality, comprising:

retrieving, from one or more memory devices, an augmented reality password personalized for a user based on information previously configured by the user, the augmented reality password comprising at least one augmented reality object;

presenting the at least one augmented reality object via a display on a personal user device;

collecting from the user an input associated with the at least one augmented reality object, wherein the input comprises at least one of moving, rotating, or selecting the augmented reality object;

determining, based on the input, an organization of the at least one augmented reality object;

comparing the organization of the at least one augmented reality object to the augmented reality password; and determining, based on the comparison, whether to approve an authentication request.

17. The computer-implemented method of claim 16, wherein the input comprises selecting at least two augmented reality objects, the at least two augmented reality objects having at least one of: different sizes, different colors, or different dimensions.

18. The computer-implemented method of claim 16, wherein the augmented reality object comprises a virtual key pad.

19. The computer-implemented method of claim 16, wherein the one or more memory devices store multiple augmented reality passwords of the user.

20. The computer-implemented method of claim 16, wherein collecting the input from the user comprises capturing a hand gesture of the user in front of a camera.

* * * * *